United States Patent
Braun et al.

(10) Patent No.: US 10,237,022 B2
(45) Date of Patent: Mar. 19, 2019

(54) METHOD FOR A FIRST NETWORK NODE FOR TRANSMITTING OR RETRANSMITTING DATA TO A SECOND NETWORK NODE AND FIRST NETWORK NODE THEREOF AND METHOD FOR A SECOND NETWORK NODE FOR RECEIVING DATA TRANSMITTED OR RETRANSMITTED FROM A FIRST NETWORK NODE AND SECOND NETWORK NODE THEREOF

(71) Applicant: Alcatel Lucent, Boulogne Billancourt (FR)

(72) Inventors: Volker Braun, Stuttgart (DE); Uwe Doetsch, Stuttgart (DE)

(73) Assignee: Alcatel Lucent, Nozay (FR)

( * ) Notice: Subject to any disclaimer, the term of this patent is extended or adjusted under 35 U.S.C. 154(b) by 167 days.

(21) Appl. No.: 14/905,416

(22) PCT Filed: May 22, 2014

(86) PCT No.: PCT/EP2014/060500
§ 371 (c)(1),
(2) Date: Jan. 15, 2016

(87) PCT Pub. No.: WO2015/007420
PCT Pub. Date: Jan. 22, 2015

(65) Prior Publication Data
US 2016/0173237 A1    Jun. 16, 2016

(30) Foreign Application Priority Data

Jul. 15, 2013   (EP) ..................................... 13306003

(51) Int. Cl.
*H04L 1/18* (2006.01)
*H04L 1/00* (2006.01)
*H04L 1/16* (2006.01)

(52) U.S. Cl.
CPC .......... *H04L 1/1819* (2013.01); *H04L 1/0056* (2013.01); *H04L 1/0075* (2013.01);
(Continued)

(58) Field of Classification Search
CPC ... H04L 1/0056; H04L 1/0057; H04L 1/0075; H04L 1/0076; H04L 1/1607; H04L 1/1819; H04L 1/1896
See application file for complete search history.

(56) References Cited

U.S. PATENT DOCUMENTS

| 8,015,474 | B2* | 9/2011 | Izzat | ..................... H04L 1/0009 714/751 |
| 2002/0064167 | A1* | 5/2002 | Khan | ..................... H04L 1/1819 370/410 |

(Continued)

OTHER PUBLICATIONS

International Search Report for PCT/EP/2014/060500 dated Sep. 1, 2014.

*Primary Examiner* — Jenee Holland
(74) *Attorney, Agent, or Firm* — Fay Sharpe LLP

(57) ABSTRACT

The embodiments of the invention relate to a method for a first network node (NN 1) for transmitting or retransmitting data to a second network node (NN2). The method contains receiving at the first network node (NN1) from the second network node (NN2) a feedback parameter (FP) in response to a first transmission (DT1) of at least two data segments (DS1-1, DS2-1, DS3-1) of a data packet. The feedback parameter (FP) is a number of counted data segments of the at least two data segments (DS1-1, DS2-1, DS3-1) incorrectly received or lost or correctly received at the second network node (NN2) by the first transmission (DT1). The (Continued)

method further contains determining at the first network node (NN 1) for a second transmission (DT2) to the second network node (NN2) the data (DS1-2, DS2-2, DS3-2, NCS, DS1 1 R, DS21 R, DS31 R) as a function of the feedback parameter (FP) and transmitting or retransmitting the data (DS 1-2, DS2-2, DS3-2, NCS, DS1 1 R, DS21 R, DS31 R) by the second transmission (DT2) from the first network node (NN 1) to the second network node (NN2). The embodiments of the invention further relate to a further method for the second network node (NN2) for receiving data transmitted or retransmitted from the first network node (NN 1). The further method (MET-NN2) contains determining at the second network node (NN2) the feedback parameter (FP) in response to the first transmission (DT1) from the first network node (NN 1) to the second network node (NN2), transmitting from the second network node (NN2) the feedback parameter (FP) to the first network node (NN 1), and receiving at the second network node (NN2) the data (DS 1-2, DS2-2, DS3-2, NCS, DS 1 1 R, DS21 R, DS31 R) by the second transmission (DT2) from the first network node (NN 1). The embodiments of the invention further relate to a first computer program, the first network node (NN 1), a second computer program and to the second network node (NN2).

15 Claims, 5 Drawing Sheets

(52) U.S. Cl.
CPC .......... *H04L 1/0076* (2013.01); *H04L 1/1896* (2013.01); *H04L 1/0057* (2013.01); *H04L 1/1607* (2013.01)

(56) References Cited

U.S. PATENT DOCUMENTS

| | | | |
|---|---|---|---|
| 2002/0136162 A1* | 9/2002 | Yoshimura | H04L 29/06 370/229 |
| 2003/0118107 A1* | 6/2003 | Itakura | H04N 21/234327 375/240.19 |
| 2005/0160346 A1* | 7/2005 | Yamane | H03M 13/2707 714/776 |
| 2005/0251721 A1 | 11/2005 | Ramesh et al. | |
| 2006/0018259 A1* | 1/2006 | Kadous | H04L 1/1829 370/236 |
| 2006/0069799 A1* | 3/2006 | Hundscheidt | H04W 28/10 709/232 |
| 2006/0095944 A1* | 5/2006 | Demircin | H04N 19/172 725/81 |
| 2006/0203729 A1* | 9/2006 | Deshpande | H04L 1/1825 370/235 |
| 2007/0274342 A1* | 11/2007 | Kim | H04L 1/1607 370/473 |
| 2009/0313519 A1* | 12/2009 | Nagaraja | H04L 1/0042 714/751 |
| 2010/0138715 A1* | 6/2010 | Motoyoshi | H04B 7/043 714/749 |
| 2010/0275087 A1* | 10/2010 | Doppler | H04L 1/1614 714/749 |
| 2011/0299450 A1 | 12/2011 | Ye et al. | |
| 2012/0314655 A1 | 12/2012 | Xue et al. | |
| 2013/0094437 A1 | 4/2013 | Bhattacharya | |
| 2013/0176939 A1 | 7/2013 | Trainin et al. | |

\* cited by examiner

METHOD FOR A FIRST NETWORK NODE FOR TRANSMITTING OR RETRANSMITTING DATA TO A SECOND NETWORK NODE AND FIRST NETWORK NODE THEREOF AND METHOD FOR A SECOND NETWORK NODE FOR RECEIVING DATA TRANSMITTED OR RETRANSMITTED FROM A FIRST NETWORK NODE AND SECOND NETWORK NODE THEREOF

FIELD OF THE INVENTION

The present invention relates to transmission and retransmission of data in a communication system and, more particularly but not exclusively, to retransmission and network coding in a radio communication system.

BACKGROUND OF THE INVENTION

This section introduces aspects that may be helpful in facilitating a better understanding of the invention. Accordingly, the statements of this section are to be read in this light and are not to be understood as admission about what is in the prior art.

When a data volume such as a data packet is transmitted initially by radio frequency signals from a first transceiver apparatus via a transmission channel such as a wireless transmission channel to a second transceiver apparatus, several effects such as scattering, fading and/or power decay usually have an impact on the transmitted signal at a location of the second transceiver apparatus and therefore, modified radio frequency signals or in a worst case no radio frequency signals are received by the second transceiver apparatus so that the second transceiver apparatus may not be able to recover error-free the data packet by a single transmission. For solving this problem, several retransmission techniques with one or several further retransmissions from the first transceiver apparatus to the second transceiver apparatus have been developed.

HARQ (HARQ=hybrid automatic repeat request) with chase combining or incremental redundancy is widely used in modern packet based wireless communication systems such as UMTS systems (UMTS=Universal Mobile Telecommunication Systems), HSPA systems (HSPA=High Speed Packet Access) or LTE systems (LTE=Long Term Evolution). HARQ is used in these systems in conjunction with adaptive modulation and coding so as to compensate for transmission errors caused by imperfect link adaptation. Imperfect link adaptation causes significant throughput degradation as compared to the theoretical limits, despite of using HARQ. With HARQ, typically a CRC check (CRC=Cyclic Redundancy Check) is performed at the second transceiver apparatus upon reception of a first transmission of an encoded data packet and the result of the CRC check, PASS or FAIL, is reported to the first transceiver apparatus as an ACK (ACK=acknowledgement) or a NACK (NACK=Negative Acknowledgement), respectively. In case of NACK, the first transceiver apparatus performs a retransmission of the data packet to the second transceiver apparatus and soft combining of the codewords of the received first transmission and the received retransmission is performed by the second transceiver apparatus before the decoding. Soft combining improves error rate performance as compared to simply discarding the first transmission attempt at the second transceiver apparatus.

With chase combining the retransmission uses the same codeword size and same RV parameters (RV=redundancy version), i.e. puncturing patterns, as the first transmission. By applying common incremental redundancy, the retransmission uses a different puncturing pattern than in the first transmission. When using an advanced incremental redundancy, only a subset of the information bits or none of the information bits of the first transmission and only different parity bits than of the first transmission are sent by the retransmission for consuming less radio link capacity.

So-called segmented HARQ is a HARQ technique, where a data packet P is partitioned into N segments. For each segment a receiver of the segment reports an ACK/NACK message to the transmitter to indicate whether the segment was correctly received. Segments for which the transmitter receives a NACK will be retransmitted, e.g. by applying incremental redundancy or chase combining.

A HARQ scheme using network coding applies a joint retransmission of two or more data segments. Therefore, a data segment for the joint retransmission is obtained for example by superimposing so-called hard bits of the two or more data segments for example by modulo 2 addition.

SUMMARY

Throughput performance is a critical issue in wireless communication, because a radio link is usually a bottleneck for a transmission of data from a base station to a mobile station or backwards. Thus, one object of the embodiments of the invention is to reduce feedback overhead for retransmissions.

The object is achieved by a method for a first network node for transmitting or retransmitting data to a second network node. The method contains the step of receiving at the first network node from the second network node a feedback parameter in response to a first transmission of at least two data segments of a data packet. The at least two data segments may have been transmitted during the first transmission for example by a single transmission time interval or as part of a single transmission time interval or by at least two consecutive transmission time intervals or as part of at least two consecutive transmission time intervals or by at least two non-consecutive transmission time intervals or as part of at least two non-consecutive transmission time intervals such as TTIs (TTI=Transmission Time Interval) as being used in 3GPP LTE (3GPP=3rd Generation Partnership Project).

The feedback parameter is a number of counted data segments of the at least two data segments, which have been incorrectly received or lost at the second network node or is a number of counted data segments of the at least two data segments correctly received at the second network node by the first transmission. The method further contains the steps of determining at the first network node for a second transmission to the second network node the data as a function of the feedback parameter, and transmitting or retransmitting the data by the second transmission from the first network node to the second network node.

The object is further achieved by a method for a second network node for receiving data transmitted or retransmitted from a first network node. The method contains the step of determining at the second network node a feedback parameter in response to a first transmission of at least two data segments of a data packet from the first network node to the second network node. The feedback parameter is a number of counted data segments of the at least two data segments, which have been incorrectly received or lost at the second network node or is a number of counted data segments of the at least two data segments correctly received at the second network node by the first transmission. The method further contains the steps of transmitting from the second network node the feedback parameter to the first network node, and receiving at the second network node the data by a second transmission from the first network node.

The object is further achieved by a first network node for transmitting or retransmitting data to a second network node. The first network node may be for example a base station, a mobile station or a relay station.

The first network node contains means for receiving from the second network node a feedback parameter in response to a first transmission of at least two data segments of a data packet. The feedback parameter is a number of counted data segments of the at least two data segments, which have been incorrectly received or lost at the second network node or is a number of counted data segments of the at least two data segments correctly received at the second network node by the first transmission. The first network node further contains means for determining for a second transmission to the second network node the data as a function of the feedback parameter, and means for transmitting or retransmitting the data by the second transmission to the second network node.

In embodiments, the means for receiving the feedback parameter may correspond to any transceiver unit, receiver unit, etc. Hence, in embodiments the means for receiving the feedback parameter may contain an input for received radio frequency signals, which contain the feedback parameter, an information extraction unit, which contains sub-units such as a down-converter unit, a decoding unit, a demodulation unit etc. for extracting the feedback parameter from the received radio frequency signals, and an output for the feedback parameter. In some embodiments the means for receiving the feedback parameter can be implemented partly in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

In embodiments, the means for determining the data as the function of the feedback parameter may correspond to any determining unit, determination unit, processing unit, etc. Hence, in embodiments, the means for determining the data as the function of the feedback parameter may contain an input for the feedback parameter, an algorithm, which determines the data by analyzing the feedback parameter and by selecting the data as being adequate to the analyzed feedback parameter and an output for the data or for information, which identifies the data. In some embodiments the means for determining the data can be implemented in terms of a computer program and a hardware component on which the computer program is executed, such as a DSP, an ASIC, an FPGA or any other processor.

In embodiments, the means for transmitting or retransmitting the data may correspond to any transceiver unit, transmitter unit, etc. Hence, in embodiments the means for transmitting the data may contain an input for the data, a radio signal generation unit with sub-units such as coding unit, modulation unit, up-converter unit and amplification unit for generating radio frequency signals, which contain the data, and an output for the radio frequency signals containing the data. In some embodiments the means for transmitting the data can be implemented partly in terms of a computer program and a hardware component on which the computer program is executed, such as a DSP, an ASIC, an FPGA or any other processor.

The object is further achieved by a second network node for receiving data from a first network node. The second network node may be for example a base station, a mobile station or a relay station.

The second network node contains means for determining a feedback parameter in response to a first transmission of at least two data segments of a data packet from the first network node to the second network node. The feedback parameter is a number of counted data segments of the at least two data segments, which have been incorrectly received or lost at the second network node or is a number of counted data segments of the at least two data segments correctly received at the second network node by the first transmission. The second network node further contains means for transmitting the feedback parameter to the first network node, and means for receiving the data by a second transmission from the first network node.

In embodiments, the means for determining the feedback parameter may correspond to any determining unit, determination unit, processing unit, etc. Hence, in embodiments, the means for determining the feedback parameter may contain an input for results, whether a data recovery of the at least two data segments was successful or unsuccessful, an algorithm, which determines the feedback parameter as a function of the results and an output for the feedback parameter. In some embodiments the means for determining the feedback parameter can be implemented in terms of a computer program and a hardware component on which the computer program is executed, such as a DSP, an ASIC, an FPGA or any other processor.

In embodiments, the means for transmitting the feedback parameter may correspond to any transceiver unit, transmitter unit, etc. Hence, in embodiments the means for transmitting the feedback parameter may contain an input for the feedback parameter, a radio signal generation unit with sub-units such as a coding unit, a modulation unit, an up-conversion unit and an amplification unit for generating radio frequency signals, which contain the feedback parameter, and an output for the radio frequency signals containing the feedback parameter. In some embodiments the means for transmitting the feedback parameter can be implemented partly in terms of a computer program and a hardware component on which the computer program is executed, such as a DSP, an ASIC, an FPGA or any other processor.

The methods for the first network node and the second network node, the first network and the second network provide a first advantage of providing an alternative feedback parameter, when the data packet is segmented into exactly two data segments. It also provides a second advantage of reducing an amount of feedback information in case of a segmentation into more than two data segments for the first transmission because the feedback overhead being for example in units of bits scales approximately with $\log_2(N+1)$ with N being the number of data segments. The first summand "1" within the brackets accounts for the case, that all data segments have been recovered error-free and the second summand "N" within the brackets accounts for the number of possible erroneous data segments.

According to a preferred embodiment, the data are new data segments not yet transmitted, when said feedback parameter indicates an error-free reception of all data segments of the at least two data segments or the data are further redundancy information for the at least two data segments, when the feedback parameter indicates indicates at least one of the at least two data segments as being incorrectly received or lost. The further redundancy information may be based for example on chase combining or incremental redundancy.

According to a further preferred embodiment, the method may further contain the step of selecting the data based on a transmission and retransmission policy and the transmission and retransmission policy may contain rules for states or events, when the feedback parameter indicates the error-free reception of all the data segments of the at least two data segments, and when the feedback parameter indicates the at least one of the at least two data segments as being incorrectly received or lost. Correspondingly, the first network node further contains means for selecting the data based on the transmission and retransmission policy.

In embodiments, the means for selecting the data based on the transmission and retransmission policy may correspond to any selecting unit, selection unit, etc. Hence, in embodiments, the means for selecting the data based on the transmission and retransmission policy may contain an input for the feedback parameter, an algorithm, which selects a rule for constructing the data and an output for the construction rule. In some embodiments the means for selecting the data based on the transmission and retransmission policy can be implemented in terms of a computer program and a hardware component on which the computer program is executed, such as a DSP, an ASIC, an FPGA or any other processor.

With regard to even further preferred embodiments, the transmission and retransmission policy may be predefined at the first network node or the method may further contain the step of adapting the transmission and retransmission policy by the first network node for optimizing the determining of the data based on the feedback parameter and transmitting an indicator for a structure of the data from the first network node to the second network node. Correspondingly, the first network node further contains means for adapting the transmission and retransmission policy.

In embodiments, the means for adapting the transmission and retransmission policy may correspond to any adaptation unit, processing unit, etc. Hence, in embodiments, the means for adapting the transmission and retransmission policy may contain an input for statistic results which relate a success rate of a retransmission to a reported feedback parameter, an algorithm, which determines a new transmission and retransmission policy based on an evaluation of the statistic results and an output for the new transmission and retransmission policy. In some embodiments the means for adapting the transmission and retransmission policy can be implemented in terms of a computer program and a hardware component on which the computer program is executed, such as a DSP, an ASIC, an FPGA or any other processor.

According to a further embodiment, the further redundancy information may be either of the following:
  a single network coded superposition of all data segments of the at least two data segments, when a single data segment of the at least two data segments has been incorrectly received or lost,
  a single network coded superposition of all data segments of the at least two data segments, when all data segments of the at least two data segments have been incorrectly received or lost,
  at least one network coded superposition of at least two data segments of the at least two data segments, when at least one data segment of the at least two data segments has been incorrectly received or lost,
  at least one network coded superposition of at least one of the at least two data segments and of at least one of the new data segments (DS1-2, DS2-2, DS3-2).

By an even further embodiment, a number of the at least one network coded superposition being retransmitted by the second transmission may be equal to a number of the at least two data segments being incorrectly received or lost. This means, that the data contain one or several network coded superposition, whose number linearly increases with the number of the at least two data segments being incorrectly received or lost.

In even further embodiments, the at least one network coded superposition and at least one further network coded superposition for said second transmission may contain different data segments of the at least two data segments or may contain at least one same data segment of the at least two data segments.

In a further embodiment, the data for the further transmission may contain at least one data segment derived from one of the network coded superpositions described above and may further contain at least one further data segment of not yet transmitted data.

According to various embodiments, the at least one network coded superposition of the at least two data segments may be generated by applying either of the following: a modulo-2 addition, an analogue superposition, a Fountain code, a Luby transform code, or a Raptor code.

In a further embodiment, the feedback parameter received at the first network node from the second network node in response to the second transmission may contain a sub-counter for a success or failure of data segments for which the further redundancy information has been transmitted and contains a further sub-counter for a success or failure of the new data segments.

In a further embodiment, the second network node may be configured depending on a predefined criterion to either report an acknowledgement indicator or a non-acknowledgement indicator for the at least two data segments in response to the first transmission or to report the feedback parameter.

Preferably, the predefined criterion may be a predefined load in a radio cell. In such a case, the acknowledgement indicator or the non-acknowledgement indicator may be reported, when a current load is below or equal to the predefined load and the feedback parameter may be reported, when the current load is above the predefined load.

According to even further embodiments, the first method for the first network node and the second method for the second network node may be operated for example on the so-called MAC layer (MAC=Media Access Control) as part of the so-called data link layer of the OSI model (OSI=Open Systems Interconnection) in case of HARQ retransmissions, on the RLC layer (RLC=Radio Link Control) as part of the data link layer in case of RLC retransmissions or on the TCP layer (TCP=Transmission Control Protocol) as part of the so-called transport layer of the OSI model in case of TCP retransmissions.

Further advantageous features of the embodiments of the invention are defined and are described in the following detailed description.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
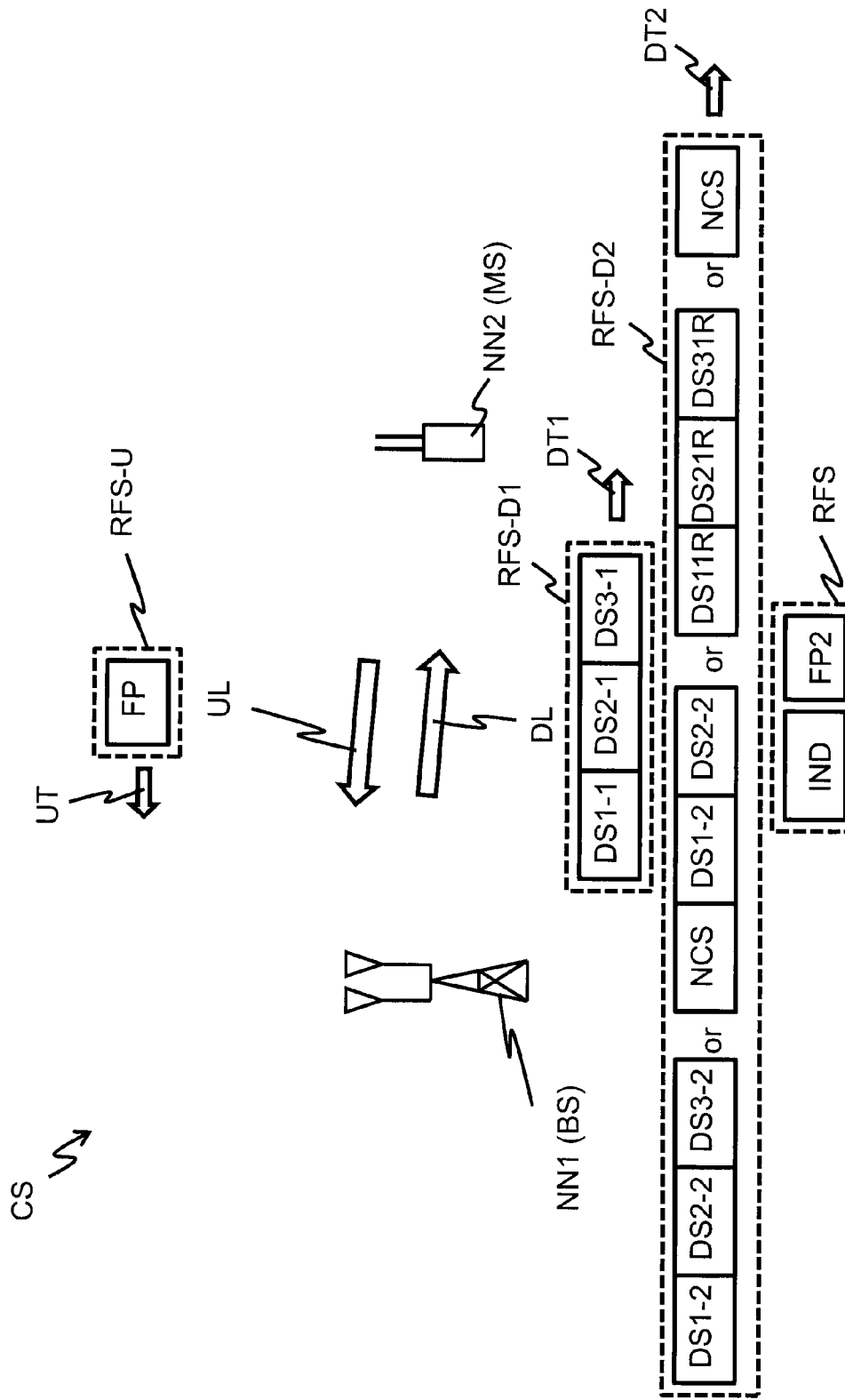
FIG. 1 shows schematically a block diagram of a communication system, which contains a first network node in communication with a second network node.

FIG. 1 shows schematically a block diagram of a communication system CS, which contains a first network node NN1 in communication with a second network node NN2. Further network nodes of the communication system CS are not shown for simplification. The communication system CS may be for example a radio communication system based on a wireless communication technique such as WLAN (WLAN=Wireless Local Area Network) being defined by one of IEEE 802.11 standards (IEEE=Institute of Electrical and Electronics Engineers), WiMAX (WiMAX=Worldwide Interoperability for Microwave Access) being ratified by the WiMAX Forum, EVDO (EVDO=Enhanced Voice-Data Optimized or Enhanced Voice-Data Only) being standardized by 3GPP2 (3GPP2=3rd Generation Partnership Project 2), or UMTS/HSPA (HSPA=High Speed Packet Access), LTE (LTE=Long Term Evolution) or LTE Advanced being defined by 3GPP.

The first network node NN1 may be for example a base station BS and the second network node NN2 may be for example a mobile station MS such as shown in FIG. 1. In alternative embodiments, the communication may be performed as a radio communication between two base stations, between two mobile stations, between a base station and a relay station or between a relay station and a mobile station.

The term "base station" may be considered synonymous to and/or referred to as a base transceiver station, access point base station, access point, macro base station, micro base station, femto base station, pico base station etc. and may describe equipment that provides wireless connectivity via one or more radio links to one or more mobile stations.

The term "mobile station" may be considered synonymous to, and may hereafter be occasionally referred to, as a mobile unit, mobile user, access terminal, user equipment, subscriber, user, remote station etc. The mobile station RAN1-MS may be for example a cellular telephone, a portable computer, a pocket computer, a hand-held computer, a personal digital assistant or a vehicle-mounted mobile device such as a car-mounted mobile device.

The term "relay station" may be considered synonymous to and/or referred to as an electronic radio communication device that receives a signal and retransmits a different signal not only at a higher level or higher power, but also at a different frequency and/or different time slot and/or spreading code, to increase capacity in a wireless access network and to improve wireless link performance.

The following description is given for a transmission of user data or signalling data on a downlink DL from the base station BS to the mobile station MS. It may be applied equally for a transmission of user data or signalling on an uplink UL from the mobile station MS to the base station BS.

The base station BS transmits first downlink radio frequency signals RFS-D1 by a first downlink transmission DT1 to the mobile station MS. The first downlink radio frequency signals RFS-D1 contain two or more data segments of a data packet. With respect to FIG. 1, the first downlink radio frequency signals RFS-D1 exemplarily contain three data segments DS1-1, DS2-1, DS3-1 of a first data packet, which each fits into a corresponding radio resource. When the first downlink radio frequency signals RFS-D1 are received by the mobile station MS, the mobile station MS processes the first downlink radio frequency signals RFS-D1 in a conventional way and tries to recover the three data segments DS1-1, DS2-1, DS3-1. Depending on a success or failure of the data recovery of the three data segments DS1-1, DS2-1, DS3-1, the mobile station MS performs an uplink transmission UT and transmits to the base station BS uplink radio frequency signals RFS-U, which contain a feedback parameter FP. The feedback parameter FP tells the base station BS, how many of the three data segments DS1-1, DS2-1, DS3-1 have been successfully recovered by the mobile station MS or how many of the three data segments DS1-1, DS2-1, DS3-1 have been failed to recover by the mobile station MS. Thereby, the feedback parameter FP is correlated to a number of two or more data segments, which have been incorrectly received or lost at the mobile station MS by the first downlink transmission DT1. The feedback parameter FP may be for example in case of a block wise transmission of the three data segments DS1-1, DS2-1, DS3-1 two bits and either the two bits indicate a number of data segments which have been successfully recovered by the mobile station MS or the two bits indicate a number of data segments for which the data recovery has been failed by either an erroneous data segment or by a lost data segment, which has not been received by the mobile station MS.

After a reception of the feedback parameter FP at the base station BS, the base station BS determines data for a second downlink transmission DT2 via the downlink DL to the mobile station MS. Which data are determined, depends on the information content of the feedback parameter FP.

When the feedback parameter FP indicates, that all three data segments DS1-1, DS2-1, DS3-1 of the first downlink transmission DT1 have been all successfully recovered at the mobile station MS, the base station BS may determine further three data segments DS1-2, DS2-2, DS3-2 of the first data packet or a second data packet as the data for the second downlink transmission DT2, which fit into one or several corresponding further radio resources.

In case of segmented HARQ, a radio resource such as an LTE TTI may be applied for the first downlink transmission DT1 and a further LTE TTI may be applied for the second downlink transmission DT2. In case of a retransmission, which is controlled by higher layers such as the TCP layer, each data segment of the first downlink transmission DT1 and of the second downlink transmission DT2 may be allocated to a separate radio resource such as an LTE TTI.

In a further embodiment for a communication system using multiple component carriers such as for example in a radio communication system based on LTE Release 10, different data segments of the first downlink transmission DT1 and/or of the second downlink transmission DT2 may also be transmitted on different component carriers.

When the feedback parameter FP indicates, that one or two of the three data segments DS1-1, DS2-1, DS3-1 has been received in error at the mobile station MS, the base station BS may determine for example a first data segment allocated by a network coded superposition NCS of the three data segments DS1-1, DS2-1, DS3-1 and the further data segments DS1-2, DS2-2 as the data for the second downlink transmission DT2, which fit into the one or several corresponding further radio resources. Alternatively, the base station BS may determine only the network coded superposition NCS of the three data segments DS1-1, DS2-1, DS3-1 as the data for the second downlink transmission DT2.

Various alternatives how to generate the network coded superposition NCS are described below with respect to Table 1.

When the feedback parameter FP indicates, that all three data segments DS1-1, DS2-1, DS3-1 of the first downlink transmission DT1 have been received in error at the mobile station MS, the base station BS may determine further redundancy information DS11R for the data segment DS1-1, further redundancy information DS21R for the data segment DS2-1 and further redundancy information DS31R for the data segment DS3-1 as the data for the second downlink transmission DT2, which fit into the one or several corresponding further radio resources.

The further redundancy information DS11R may be equal to the data segment DS1-1, the further redundancy information DS21R may be equal to the data segment DS2-1 and the further redundancy information DS31R may be equal to the data segment DS3-1, which means that chase combining is applied by the base station BS. In an alternative, the further redundancy information DS11R may be a different redundancy version for the data segment DS1-1, the further redundancy information DS21R may be a different redundancy version for the data segment DS2-1 and the further redundancy information DS31R may be a different redundancy version for the data segment DS3-1, which means that incremental redundancy is applied by the base station BS. In a further alternative, the further redundancy information DS11R, DS21R and DS31R may be a network coded superposition of two or more of the data segments DS1-1, DS2-1, DS3-1 or a network coded superposition of a corresponding data segment such as DS1-1 for further redundancy information DS11R and of one of the further data segments DS1-2, DS2-2, DS3-2.

When the data for the second downlink transmission DT2 have been determined and generated by one of the alternatives described above e.g. by the network coded superposition, the data are transmitted as second downlink radio frequency signals RFS-D2 from the base station BS to the mobile station MS.

By a further embodiment, which is described in more detail below with respect to FIG. 2, the base station BS may transmit to the mobile station MS by further radio frequency signals RFS for example on a signalling channel or by a header of a message with contains the data for the second downlink transmission DT2 an indicator IND for informing the mobile station MS how the data are selected and generated at the base station BS especially when the base station BS has several possibilities for performing a retransmission after an initial transmission.

The indicator IND may be for example a group of four bits for being able to signal 16 different selections. The bit pattern "0000" may be for example an indication for the second row (FP="00") of table 1 (see below, first row is the row with the table heading) and the bit pattern "0010" may be for example an indication for the fifth row (FP="10" and selection "First network coded superposition $NCS_{10\_1}$ and second network coded superposition $NCS_{10\_2}$ and one new data segment, which has been not yet transmitted") of table 1.

Alternatively, the indicator IND may be for example a group of two bits for being able to signal 4 different selections with respect to the received feedback parameter FP. In case of the received feedback parameter FP having a bit pattern such as "10" using the bit pattern "00" for the indicator IND may be an indication for having selected the data according to the fifth row of table 1 (see below) and using the bit pattern "10" for the indicator IND may be an indication for having selected the data according to the seventh row of table 1. In this example the base station BS may also transmit a feedback parameter FP2 by further radio frequency signals RFS for example on a signalling channel or by a header of a message with contains the data for the second downlink transmission DT2 to the mobile station MS. The feedback parameter FP2 may be identical to the received feedback parameter FP, which has been decoded at the base station BS and which has been evaluated for determining the data for the second downlink transmission DT2. In an alternative, the feedback parameter FP2 may be different to the received and decoded feedback parameter FP, when the base station BS for example decides not to send retransmissions as expected by the mobile station MS for the transmitted feedback parameter FP.

In a further embodiment, the mobile station MS may be configured depending on some criteria to either report an ACK/NACK indicator for each data segment DS1-1, DS2-1, DS3-1 in response to the first downlink transmission DT1, or to report the feedback parameter FP. For example, the former alternative is used if a load in the cell, such as the number of active users, is below a predefined threshold. The predefined threshold may be configurable by the mobile network operator via O&M (O&M=Operation and Maintenance).

Both, the indicator IND and the feedback parameter FP2 or only one of the indicator IND and the feedback parameter FP2 may be transmitted from the base station BS to the mobile station MS.

According to an alternative embodiment not shown in a further figure for simplification, the communication system CS may be a high-speed LAN (LAN=Local Area Network) that can operate at data rates up to 1 Gbit/s over existing home wiring (power lines, phone lines and coaxial cables). In such a case, the retransmission may be based on HARQ such as applied by the G.hn technology family of standards developed under ITU-T (ITU-T=International Telecommunication Union's Telecommunication Standardization). G.hn uses CRC-32C for Error Detection, LDPC (LDPC=Low-Density Parity-Check) for Forward Error Correction and Selective Repeat for ARQ.

Further alternatives for determining the data for the second downlink transmission DT2 are described in the following with respect to the FIG. 2.

Figure 2:
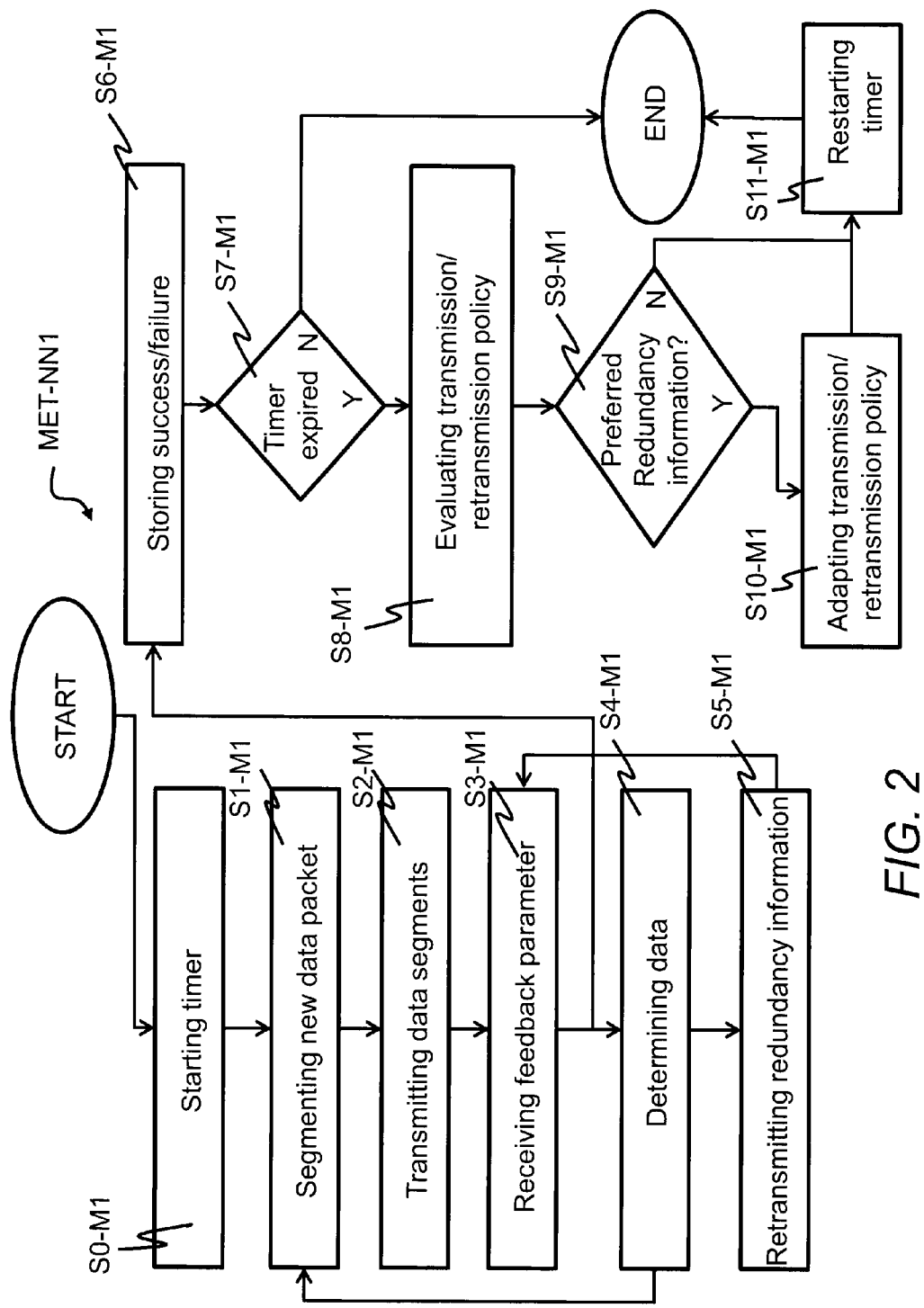
FIG. 2 shows schematically an exemplarily flow diagram of a method of the first network node.

FIG. 2 shows a flow diagram of a method MET-NN1 of the first network node NN1. The number of the steps for performing the method MET-NN1 is not critical, and as can be understood by those skilled in the art that the number of the steps and the sequence of the steps may vary without departing from the scope of the embodiments of the invention as defined in the appended claims.

In the following, the method MET-NN1 will be described with respect to the base station BS, i.e. the base station BS executes the method MET-NN1. A person skilled in the art may easily adapt the method MET-NN1 to be executed by any other network node, which transmits and retransmits data to a further network node.

The method MET-NN1 may be started for example when the base station BS wants to transmit downlink user data or downlink signalling data to the mobile station MS. The method MET-NN1 may be also started, when the mobile station MS1 has been made for example a handover from a further base station (not shown in FIG. 1 for simplification) to the base station BS.

A number of the data segments in which the first data packet and following data packets are split or segmented depends on a number of bits available for feedback parameter FP or more generally depends on a maximum number of data segments, which can be reported by the mobile station MS as being received successful or in error.

For the following description, the feedback parameter FP may consist of two digital bits. In such a case, data packets can be split or segmented into two data segments or three data segments. For segmentation into two data segments, the present invention provides no reduction in feedback overhead but it provides an alternative to known feedback schemes. For segmentation into three data segments which is described in the following, the present invention saves one feedback bit for every group of three data segments with respect to the known feedback schemes. A skilled person may easily adapt the following description for an alternative feedback parameter FP, which consists of three, four or even more digital bits.

In a first step S0-M1, the base station BS1 may start a timer for an evaluation of a transmission and retransmission policy.

In a next step S1-M1, the base station BS1 splits or segments the first data packet such as an IPv4 or IPv6 packet into the three data segments DS1-1, DS2-1, DS3-1 (see also FIG. 1).

In a further step S2-M1, the base station BS transmits the first downlink radio frequency signals, which contain the three data segments DS1-1, DS2-1, DS3-1 by the first downlink transmission DT1 to the mobile station MS.

In a further step S3-M1, the base station BS receives the feedback parameter FP for the first downlink transmission DT1 from the mobile station MS. The feedback parameter FP indicates to the base station BS, how many of the three data segments DS1-1, DS2-1, DS3-1 have been received in error or have been received successfully.

In a next step S4-M1, the base station BS determines the data for the second downlink transmission DT2 to the mobile station MS. The determination of the data depends on the information content of the feedback parameter FP and may further depend on the transmission and retransmission policy. An exemplary transmission and retransmission policy is listed in following exemplary Table 1, which may be amended by further options (not listed in the table 1 for simplification), when at least one data segment of the first transmission has been received in error:

TABLE 1

| Arrived bit pattern of the feedback parameter FP | Meaning of the arrived bit pattern of the feedback parameter FP | Potential data to be selected for a further transmission or a (further) retransmission | Preferred data selection for a specific bit pattern |
|---|---|---|---|
| "00" | No of three data segments have been received in error | Three new data segments, which have been not yet transmitted | X |
| "01" | One of three data segments have been received in error | Network coded superposition $NCS_{01}$<br><br>Network coded superposition $NCS_{01}$ and two new data segments, which have been not yet transmitted | X |
| "10" | Two of three data segments have been received in error | First network coded superposition $NCS_{10\_1}$ and second network coded superposition $NCS_{10\_2}$<br><br>First network coded superposition $NCS_{10\_1}$ and second network coded superposition $NCS_{10\_2}$ and one new data segment, which has been not yet transmitted<br><br>Third network coded superposition $NCS_{10\_3}$<br><br>Network coded superposition $NCS_{01}$ and two new data segments, which have been not yet transmitted | X |

TABLE 1-continued

| Arrived bit pattern of the feedback parameter FP | Meaning of the arrived bit pattern of the feedback parameter FP | Potential data to be selected for a further transmission or a (further) retransmission | Preferred data selection for a specific bit pattern |
|---|---|---|---|
| "11" | All of three data segments have been received in error | The three data segments, which have been already transmitted<br>Different redundancy versions of the three data segments, which have been already transmitted<br>Network coded superposition $NCS_{01}$<br>First network coded superposition $NCS_{10\_1}$ and second network coded superposition $NCS_{10\_2}$<br>First network coded superposition $NCS_{10\_1}$ and third network coded superposition $NCS_{10\_3}$ | X |

When the bit pattern or bit setting of the feedback parameter FP is "00", the further three data segments DS1-2, DS2-2, DS3-2 as shown in FIG. 1 may be determined as the data for the second downlink transmission DT2. This means, that the method MET-NN1 continues and goes back to the step S1-M1.

When the bit pattern or bit setting of the feedback parameter FP is "01", a network coded superposition $NCS_{01}$ of the three data segments DS1-1, DS2-1, DS3-1 may be determined as the data for the second downlink transmission DT2. The network coded superposition $NCS_{01}$ may be determined for example by performing a modulo 2 addition, e.g. an XOR operation, of digital bits of the three data segments DS1-1, DS2-1, DS3-1.

An information vector $a_i$ of one of the data segments DS1-1, DS2-1, DS3-1 (i.e. i=1 corresponds to data segment DS1-1, i=2 corresponds to data segment DS2-1, i=3 corresponds to data segment DS3-1), may be given for example by following equation:

$$a_i \in \mathbb{F}_2^{N_a} = \{a_{i,1}, a_{i,2}, \ldots a_{i,j}, \ldots, a_{i,N_a}\} \quad (1)$$

where:
$a_{i,j}$: bit of the information vector $a_i$ at bit position j,
$N_a$: number of bits of the information vector $a_i$,
$\mathbb{F}_2^{N_a}$: a binary vector with a length of $N_a$.

A determination unit of the base station BS may generate the network coded superposition $NCS_{01} \in \mathbb{F}_2^{N_a}$ for example according to following equation:

$$NCS_{01} = a_1 \oplus a_2 \oplus a_3 \quad (2)$$

where $\oplus$ denotes an element-wise modulo-2 addition,
$a_1$ is the information vector of the data segments DS1-1,
$a_2$ is the information vector of the data segments DS2-1,
$a_3$ is the information vector of the data segments DS3-1.

The superposition by modulo-2 addition may be performed by adding payload data of the data segments DS1-1, DS2-1, DS3-1, by adding payload plus CRC data of the data segments DS1-1, DS2-1, DS3-1 after corresponding CRC attachments to the data segments DS1-1, DS2-1, DS3-1, or by adding codewords of the data segments DS1-1, DS2-1, DS3-1 after error correction encoding of the data segments DS1-1, DS2-1, DS3-1.

When the bit pattern or bit setting of the feedback parameter FP is "10", a first network coded superposition $NCS_{10\_1}$ and a second network coded superposition $NCS_{10\_2}$ may be determined as the data for the second downlink transmission DT2. The first network coded superposition $NCS_{10\_1}$ may be determined for example by performing a modulo 2 addition, e.g. an XOR operation, of digital bits of the data segments DS1-1 and DS2-1 and the second network coded superposition $NCS_{10\_2}$ may be determined for example by performing a modulo 2 addition, e.g. an XOR operation, of digital bits of the data segments DS2-1 and DS3-1 by applying for example following equations:

$$NCS_{10\_1} = a_1 \oplus a_2$$

$$NCS_{10\_2} = a_2 \oplus a_3 \quad (3)$$

Using an alternative embodiment when the bit pattern or bit setting of the feedback parameter FP is "10", the a data segment for the data of the second downlink transmission DT2 may be determined for example by performing a modulo 2 addition, e.g. an XOR operation, of digital bits of the three data segments DS1-1, DS2-1, DS3-1 and of one of the data segments DS1-2, DS2-2, DS3-2 by applying for example following equation:

$$NCS_{10\_3} = NCS_{01} \oplus a_j \quad (4)$$

where $b_j$ is an information vector of one of the data segments DS1-2, DS2-2, DS3-2 (i.e. j=1 corresponds to data segment DS1-2, j=2 corresponds to data segment DS2-2, j=3 corresponds to data segment DS3-2).

This means, that the third network coded superposition $NCS_{10\_3}$ is a network coded superposition of data segments, which have been already transmitted by a previous downlink transmission and of a further data segment, which has been not yet transmitted before.

When the bit pattern or bit setting of the feedback parameter FP is "11", the data segments DS1-1, DS1-2 and DS1-3 using a retransmission based on chase combining may be determined as the data for the second downlink transmission DT2.

Using a first alternative embodiment when the bit pattern or bit setting of the feedback parameter FP is "11", further redundancy versions of the data segments DS1-1, DS1-2 and DS1-3 using a retransmission based on incremental redundancy may be determined as the data for the second downlink transmission DT2.

According to a second alternative embodiment when the bit pattern or bit setting of the feedback parameter FP is "11", the first network coded superposition $NCS_{10\_1}$ and the second network coded superposition $NCS_{10\_2}$ may be determined as the data for the second downlink transmission DT2.

Using a third alternative embodiment when the bit pattern or bit setting of the feedback parameter FP is "11", the first network coded superposition $NCS_{10\_1}$ and the third network coded superposition $NCS_{10\_3}$ may be determined as the data for the second downlink transmission DT2.

The second or the third alternative embodiment may be used for example, if it is expected at the base station BS based on prior transmissions, that the mobile station MS may only require some further soft bits for being able to recover error-free the data segments DS1-1, DS2-1 and DS3-1.

When two or more alternative embodiments are available for a specific bit pattern such as for the bit pattern "10", the base station BS may repeatedly test the various alternative embodiments. This may done by selecting each time another alternative embodiment, when the same specific bit pattern has been received from the mobile station MS. Test results may be stored and evaluated by steps S6-M1 to S9-M1, which are described below.

Generally, the transmission and retransmission policy may be based on following rules:

- A number of the at least one network coded superposition, which is being retransmitted by the second downlink transmission DT2 is equal to a number of the data segments, which have been incorrectly received or lost.
- The data being selected for the second downlink transmission DT2 is a single network coded superposition of all data segments of an initial transmission or a prior retransmission, when a single data segment of the data segments of the initial transmission or the prior retransmission has been incorrectly received or lost.
- When two or more network coded superpositions are selected for the second downlink transmission DT2, a first one and a second one of the two or more network coded superpositions contain either completely different data segments of the data segments of the initial transmission or the prior retransmission or contain at least one same data segment of the data segments of the initial transmission or the prior retransmission.
- For several or each bit pattern, which indicates at least one data segment as being received in error or lost, an alternative embodiment for the data may be applied with a network coded superposition, which contains a superposition of at least one data segment which has been already transmitted and of at least one data segment which has not yet been transmitted.

When two or more alternative embodiments are available for a specific bit pattern such as for the bit pattern "10", the base station BS may preferably select those data for a further transmission or a (further) retransmission, which may be labelled for example by a cross "X" within the fourth column of the table 1. This means, that such an embodiment is more often applied, than the other alternative embodiments. A position of the cross may be changed to another data selection, e.g. another row, of the specific bit pattern such as for the bit pattern "10" from a preferred selection of the first network coded superposition $NCS_{10\_1}$ and second network coded superposition $NCS_{10\_2}$ to a preferred selection of the first network coded superposition $NCS_{10\_1}$ and the third network coded superposition $NCS_{10\_3}$ for example by a method step S10-M1, which is described below.

Instead of applying the modulo 2 addition, an element $NCS_k$ of a network coded superposition may be obtained by using a generalized superposition for example according to following equation:

$$NCS_k = a_{1,k} \cdot g_1 + a_{2,k} \cdot g_2 + \ldots \quad (5)$$

where $a_{i,k}$: bits (from Galois Field GF(2)) or symbols such as bytes from Galois Field $GF(2^m)$, m>1, or (real- or complex-valued) modulation symbols, $g_i$: combination parameter with $g_i=0$ or $g_i=1$ for controlling a combination of the parameter $a_{i,k}$ for obtaining similar network coded superpositions as described above for the modulo 2 addition;

$g_i$ may be derived from pseudo-random generators; $g_i$ may be determined from the generator polynomials of code constructions such as Fountain codes, Luby transform codes or Raptor codes. Further, $g_i$ may also be drawn from $GF(2^m)$, m>1, or from a set of real or complex values.

When the data, which has been selected by the step S4-M1 contains only further redundancy information of the data segments DS1-1, DS2-1 and DS3-1 by applying chase combining, incremental redundancy or one or several network coded superpositions, step S5-M1 may be a next step.

When the data, which has been selected by the step S4-M1 contains further redundancy information of one or several of the data segments DS1-1, DS2-1 and DS3-1 and at least one new data segment, which has been not transmitted before, an intermediate step similar to the step S1-M1 is required for obtaining the at least one new data segment and the transmission of the second downlink transmission DT2 is a mixture of the step S2-M1 and the step S5-M1.

The transmission and retransmission policy may be predefined at the base station BS and at the mobile station MS and the transmission and retransmission policy may contain in such a case for each possible bit pattern a single entry for the data to be selected for a further transmission or a (further) retransmission. This means, that the base station BS just provides the data by the second downlink transmission DT2 to the mobile station MS, and the mobile station MS automatically knows by a mapping of the transmission and retransmission policy, how the data have been generated at the base station BS for the previous transmission of the feedback parameter FP.

According to an alternative embodiment, the transmission and retransmission policy may be more flexible as described above to allow the base station BS to adapt the retransmission data from retransmission to retransmission for a same reported feedback parameter FP. The transmission and retransmission policy such as shown in table 1 may be predefined at the base station BS and at the mobile station MS.

In a further embodiment, the base station BS may return the feedback parameter FP2 being identical to the received and decoded feedback parameter FP to the mobile station MS as signalling information for the second downlink transmission DT2. This embodiment solves the problem, when the base station BS does not correctly receive the feedback parameter FP, e.g. the mobile station MS transmits the bit pattern "10" as part of the feedback parameter and the base station BS decodes the bit pattern "11".

In an even further embodiment, the base station BS may not provide a retransmission for one or several data segments received in error in direct response to the received feedback parameter FP. This means that the base station BS does not retransmit data as expected by the mobile station MS. The base station BS may decide for example to transmit only new data segments. In such a case the base station BS may transmit the feedback parameter FP2 with the bit pattern "00" to the mobile station MS or the base station BS may transmit the indicator IND with the bit pattern "0010" (indicating the second row of table 1) for telling the mobile station MS, that the second downlink transmission DT2 as a response for the received feedback parameter FP is an initial transmission of the further (new) data segments DS1-2, DS2-2, DS3-2.

The mobile station MS may determine a meaning of the data segments contained within the second downlink transmission DT2 from a predefined order of the data segments in a transport block, e.g. retransmitted data segments are appended by new data segments, or interleaving of data segments according to predefined patterns is applied. Alternatively the ordering of the data segments may also be transmitted from the base station BS to the mobile station MS.

According to an alternative embodiment, the transmission and retransmission policy may be yet more flexible as described above. This means, that the base station BS has more flexibility in choosing the data for a specific bit pattern such as the bit pattern "11", which shows four alternatives in determining the data for the second downlink transmission DT2. The alternative embodiment may be realized by a transmission of a further indicator from the base station BS to the mobile station MS and the further indicator such as "2" may indicate a position in the table 1 for one of the alternatives for generating the data for the second downlink transmission DT2 with respect to the bit pattern "11", e.g. generating the data by using different redundancy versions of the three data segments DS1-1, DS2-2, DS3-1, which have been already transmitted. This means, the further indicator provides information to the mobile station MS, how the data of the second downlink transmission DT2 have been structured and generated.

According to a further embodiment, the number of retransmitted data segments of the second downlink transmission DT2 may also be implicitly derived by the mobile station MS without sending a signalling indicator IND to the mobile station MS, for example, from the sizes of the transport blocks of the first downlink transmission DT1 and of the second downlink transmission DT2, when using the predefined transmission and retransmission policy.

According to a further embodiment, for the second downlink transmission DT2 further indicators defining the transmission and retransmission strategy, for example, an indicator for the number of data segments generated at the base station BS by a network coded superposition or an indicator for the data segments containing a network coded superposition or generator coefficients for the data segments containing a network coded superposition can also be signalled from the base station BS to the mobile station MS within a packet or within a data segment, for example when the method MET-NN1 for the first network node NN1 and a method MET-NN2 for the second network node NN2 described below are operated on a higher protocol layer such as RLC or TCP.

In a further step S5-M1, the base station BS retransmits the data containing redundancy information for at least one of the three data segments DS1-1, DS2-1 and DS3-1 by second downlink radio frequency signals of the second downlink transmission DT2 to the mobile station MS.

The retransmission and retransmission policy as shown in the above table 1 may be predefined at the base station BS, when the base station BS is installed. According to an alternative embodiment, which is described with respect to further steps S6-M1, S7-M1, S8-M1 and S9-M1 of the method MET-NN1, the retransmission and retransmission policy may be adapted at the base station BS1 for example by an optimization method for reducing the number of retransmissions, which are required until the mobile station MS is able to recover and to decode error-free the data segments DS1-1, DS2-1, DS3-1, DS1-2, DS2-2, DS3-2 etc.

By next steps S6-M1 to S11-M1 the base station BS collects statistics on the retransmissions such as failure rates or success rates for the various types of retransmissions as shown in table 1.

The further step S6-M1 may be executed after the step S3-M1 and in parallel to the step S4-M1. During the step S6-M1, the base station BS may store for example following information set for each received feedback parameter FP in a database: the received bit pattern for an initial transmission or a retransmission; the received bit pattern for a first retransmission with respect to the initial transmission or a further retransmission with respect to the retransmission as an indicator for the success or failure of the retransmission; the kind of data, which have been selected for the first retransmission or the further retransmission.

In a next step S7-M1, the base station BS verifies, whether the timer for the evaluation of the transmission and retransmission policy has been expired. When the timer has been not expired, this part of the method MET-NN1 ends. When the timer has been expired, the step S8-M1 may be the next step.

In the next step S8-M1, the base station BS may evaluate the current transmission and retransmission policy by analyzing the stored information sets to get knowledge, which kind of data selected for a retransmission are more successful than other kind of data selected for a retransmission and for a specific number of data segments received successfully or in error.

In the next step S9-M1, the base station BS may verify, whether one of the alternative embodiments for selecting data for a retransmission for a specific number of failed or successfully received data segments performs better and above a threshold such as 20 percent or 40 percent more successfully recovered data segments by one embodiment in comparison with the other alternative embodiments. When the threshold has been not received or passed, step S11-M1 may be a next step. When the threshold has been received or passed, the step S10-M1 may be a next step.

In the further step S10-M1, the base station BS may change or adapt the transmission and retransmission policy by setting for example the cross "X" in a row of the table 1 for that embodiment, which has received or passed the threshold and by removing, when necessary, the cross "X" in a further row of the table 1 for an embodiment, which has not received or passed the threshold anymore.

In the next step S11-M1, the base station BS may restart the timer for the evaluation of the transmission and retransmission policy.

Figure 3:
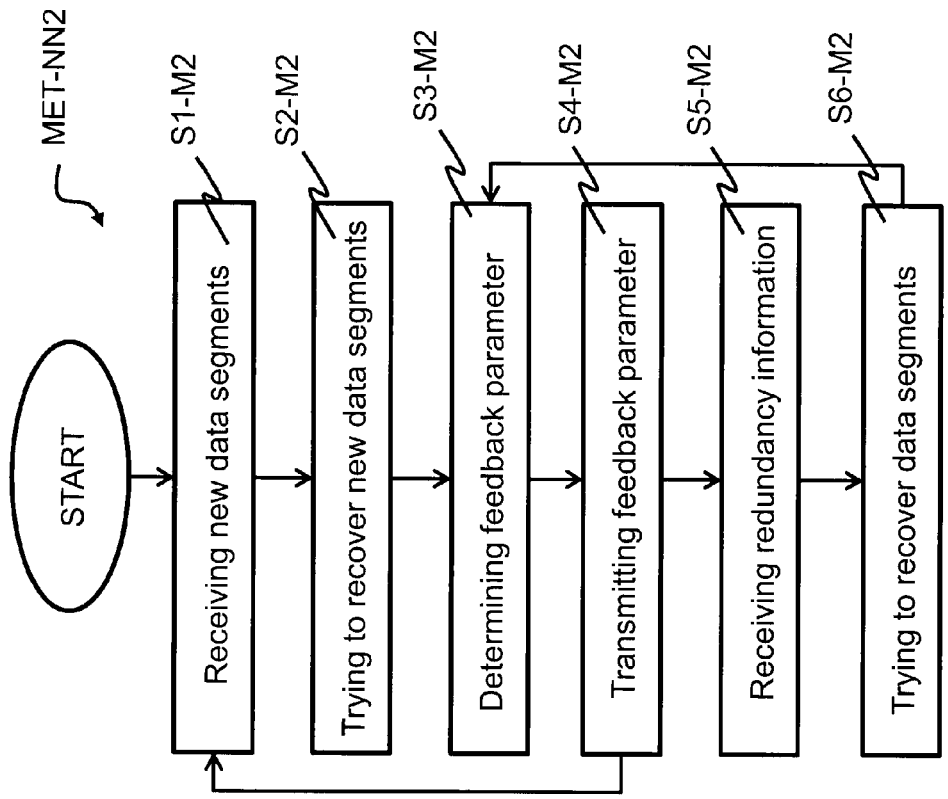
FIG. 3 shows schematically an exemplarily flow diagram of a method of the second network node.

FIG. 3 shows a flow diagram of a method MET-NN2 of the second network node NN2. The number of the steps for performing the method MET-NN2 is not critical, and as can be understood by those skilled in the art that the number of the steps and the sequence of the steps may vary without departing from the scope of the embodiments of the invention as defined in the appended claims.

In the following, the method MET-NN2 will be described with respect to the mobile station MS, i.e. the mobile station MS executes the method MET-NN2. A person skilled in the art may easily adapt the method MET-NN2 to be executed by any other network node, which receives data from a further network node and provides a feedback report for the received data to the further network node.

The method MET-NN2 may be started for example, when the first mobile station MS1 has been switched to a connected mode or a connected state for receiving a continuous flow of user data or signalling data from the base station BS. The method MET-NN2 may be also started, when the mobile station MS1 is in a dormant or idle mode and is able to wake up shortly for receiving a small amount of user data or signalling data.

In a first step S1-M2, the mobile station MS receives by the first downlink transmission DT1 the first downlink radio frequency signals, which contain the three data segments DS1-1, DS2-1, DS3-1.

In a further step S2-M2, the mobile station MS tries to extract and recover the three data segments DS1-1, DS2-1, DS3-1 from the received first downlink radio frequency signals by a demodulation and decoding method known to skilled persons in the art. With respect to the example embodiment shown in FIG. 1, the mobile station MS may not be able to receive error-free the data segment DS1-1 of the first downlink transmission DT1 and may be able to recover error-free the data segments DS2-1, DS3-1 of the first downlink transmission DT1. A wrong estimate $S'_1$ for the data segment DS1-1, which contains soft symbols for example based on log likelihood ratios, may be stored at the mobile station MS for further processing after receiving a retransmission by the second downlink transmission DT2.

In a next step S3-M2, the mobile station MS determines the feedback parameter FP depending on a result of the previous step S2-M2. When assuming a two bit feedback parameter FP as described above, a bit pattern for the feedback parameter FP may be selected according to following table 2.

TABLE 2

| Number of data segments of a group of three data segments, which are lost or have been received with a failure | Bit pattern to be selected for the feedback parameter FP |
|---|---|
| 0 | "00" |
| 1 | "01" |
| 2 | "10" |
| 3 | "11" |

In an alternative embodiment, the first column of table 2 may be adapted to list a number of data segments of a group of three data segments, which have been successfully received and decoded.

With respect to the above given example, the mobile station MS determines the bit pattern "01" for one lost or not recovered data segment of the first downlink transmission DT1.

In a further step S4-M2, the mobile station MS transmits the feedback parameter FP with the bit pattern, e.g. the bit pattern "01", to the base station BS.

A next step after the step S4-M2 depends on the result of the previous step S2-M2. When all data segments of the three data segments DS1-1, DS2-1, and DS3-1 have been successfully received and decoded, the next step will be again the step S1-M2, because the mobile station MS expects to receive the three new data segments DS1-2, DS2-2, DS3-2. When at least one of the data segments of the three data segments DS1-1, DS2-1, and DS3-1 has been received in error or has been lost, the next step will be step S5-M2, because the mobile station MS expects to receive a retransmission with further redundancy information for the at least one data segment, which could not be successfully received and decoded.

In the next step S5-M2, the mobile station MS receives by the second downlink transmission DT2 the second downlink radio frequency signals with the data, which contain the redundancy information for the at least one of the three data segments DS1-1, DS2-1 and DS3-1. With respect to the above given example, the mobile station MS may receive by the second downlink transmission DT2 the network coded superposition $NCS_{01}$, which has been generated for example by a modulo 2 addition of the data segments DS1-1, DS2-1, and DS3-1.

In a further step S6-M2, the mobile station MS tries to recover the three data segments DS1-1, DS2-1, DS3-1 from the received first downlink radio frequency signals and from the received second downlink radio frequency signals for example by adequate soft combining techniques well-known to persons skilled in the art. With respect to the above given example, the mobile station MS may determine for the network coded superposition $NCS_{01}$ for example in a first sub-step an estimate $S_{NCS}$, which contains soft symbols for example also based on log likelihood ratios. In a second sub-step, the mobile station MS may determine a second estimate $S''_1$ for the data segment DS1-1 for example by following equation for soft bits:

$$S''_1 = S_{NCS} \boxplus (S_2 \boxplus S_3) \qquad (6)$$

with $\boxplus$ : box-plus operator $S_2$: estimate (e.g. soft symbols based on log likelihood ratios) of the data segment DS2-1, which has been determined by the first downlink transmission DT1

$S_3$: estimate (e.g. soft symbols based on log likelihood ratios) of the data segment DS3-1, which has been determined by the first downlink transmission DT1.

As the estimates $S_2$ and $S_3$ were correctly decoded, the respective soft bits are very reliable (e.g. plus/minus infinity).

In a third sub-step, the mobile station MS may perform a soft combining of the estimates $S'_1$ and $S''_1$, e.g. by adding the log likelihood ratios and feed a result of the addition into a decoder unit. In a fourth sub-step after the soft combining and the decoding, the mobile station MS may obtain a first CRC code from a decoded CRC code and may calculate a second CRC code from the decoded payload. When the first CRC code and the second CRC code are identical, the mobile station MS may detect, that the soft combining and the decoding is error-free. In such a case the mobile station MS may repeat the step S3-M2 and may determine the bit pattern "00" as a new feedback parameter FP. When the CRC codes are not identical, the mobile station MS may detect, that the soft combining and the decoding is not error-free and the mobile station MS may repeat the step S3-M2 and may determine the bit pattern "01" as the new feedback parameter FP. When the second downlink transmission DT2 contains retransmissions with further redundancy information for one or several of the data segments DS1-1, DS2-1 and DS3-1, i.e. the old data segments, and initial transmissions for one or several of the data segments DS1-2, DS2-2 and DS3-2, i.e. the new data segments, the feedback parameter FP may contain a sub-counter for a success or failure of the old data segments and a further sub-counter for a success or failure of the new data segments.

The presented embodiments may be applied in a high data rate application, similar as with LTE code block segmentation. Thereby, a number of code blocks may increase linearly with data rate. This is to constrain a maximum code block size for implementation reasons, in particular it enables parallel decoder implementation at the mobile station MS.

In 3GPP LTE, a maximum code block size is 6144 bits. In such a case, the presented embodiments could also be beneficial for a low-moderate data rate with segments having a size of for example 1000 bits, e.g. to improve throughputs of mobile stations with unfavourable channel conditions, quickly moving mobile stations or infrequent/inaccurate channel quality reporting, conditions which cause frequent HARQ retransmissions. This would typically imply some overhead for the code block termination.

The embodiments presented above may be performed at the first network node NN1 and the second network node NN2 by either a single stop-and-wait process or by several stop-and-wait processes, which are executed simultaneously similar to multiple stop-and-wait HARQ processes.

Figure 4:
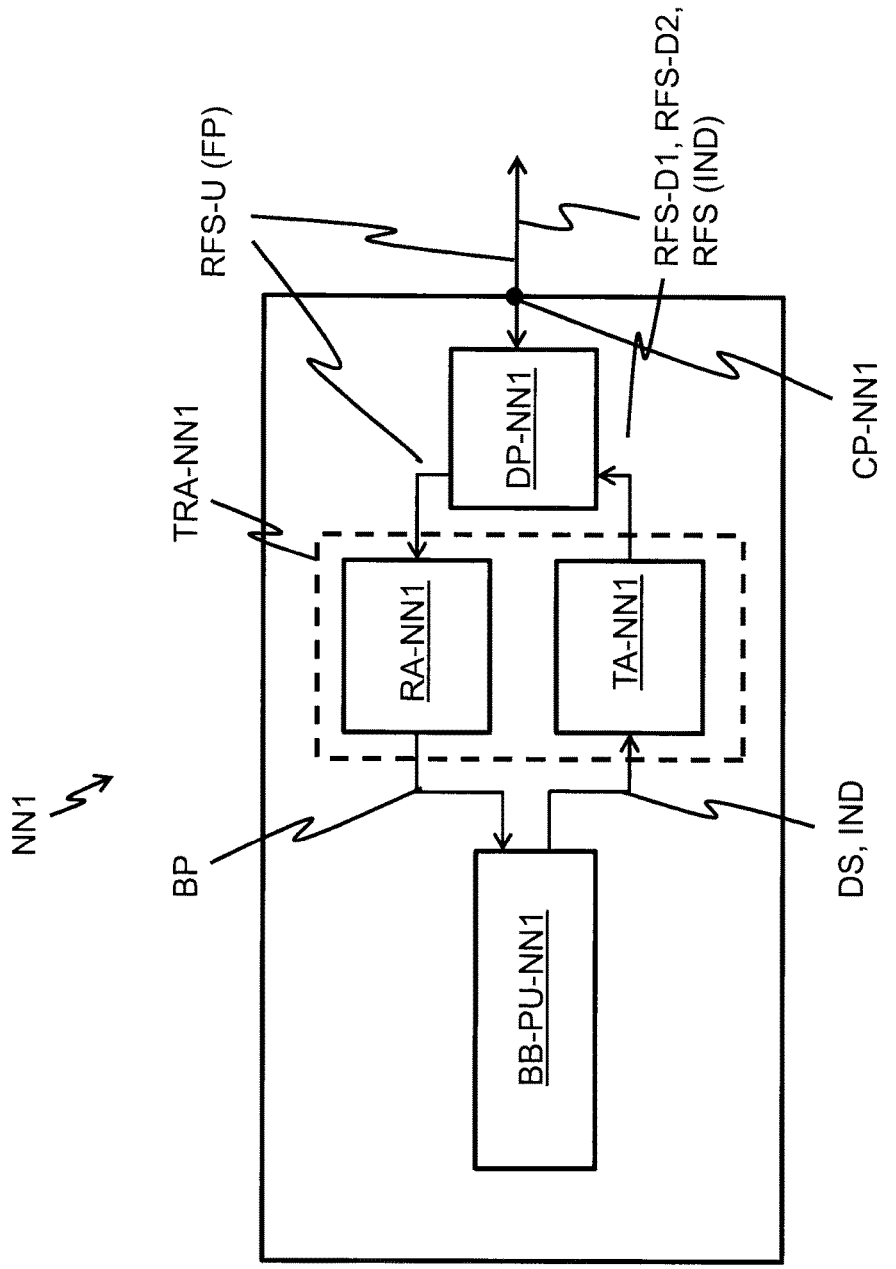
FIG. 4 shows schematically an exemplarily block diagram of the first network node.

FIG. 4 shows exemplarily the first network node NN1, which executes the method MET-NN1 (see FIG. 2). The first network node NN1 may be for example the base station BS as shown in FIG. 1. In alternative embodiments, the first network node NN1 may be a mobile station or a relay station of a radio communication system or a network node of a high-speed LAN as described above.

A splitting of processing functions across processing units shown in FIG. 4 is not critical, and as can be understood by those skilled in the art that the number of processing units, the number of processing functions and an allocation of the processing functions to the processing units may vary without departing from the scope of the embodiments of the invention as defined in the appended claims.

The first network node NN1 may contain a connection point CP-NN1 for a fibre connection or a wire connection to an antenna system, a duplexer DP-NN1, a receiver apparatus RA-NN1, a transmitter apparatus TA-NN1 and a baseband processing unit BB-PU-NN1. The receiver apparatus RA-NN1 and the transmitter apparatus TA-NN1 may be for example parts of a transceiver apparatus TRA-NN1 or may be separate units.

Following description is given exemplarily for the case, when the first network node NN1 is the base station BS as shown in FIG. 1.

Received uplink radio frequency signals RFS-U of the uplink transmission UT containing the feedback parameter FP may be provided via the connection point CP-NN1 and the duplexer DP-NN1 to the receiver apparatus RA-NN1. First downlink radio frequency signals RFS-D1 of the first downlink transmission DT1 and second downlink radio frequency signal RFS-D2 of the second downlink transmission DT2 may be provided from the transmitter apparatus TA-NN1 via the duplexer DP-NN1 and the connection point CP-NN1 to the antenna system of the base station BS. Optionally, radio frequency signal RFS containing the indicator IND, which provides information to the mobile station MS, how the data of the second downlink transmission DT2 have been structured and generated, may be provided from the transmitter apparatus TA-NN1 via the duplexer DP-NN1 and the connection point CP-NN1 to the antenna system of the base station BS.

The step S3-M1 of the method MET-NN1 may be executed by the receiver apparatus RA-NN1. The receiver apparatus RA-NN1 may provide the decoded bit pattern BP of the feedback parameter FP to the baseband processing unit BB-PU-NN1.

The steps S0-M1, S1-M1, S4-M1 and S6-M1 to S11-M1 of the method MET-NN1 may be executed for example by the baseband processing unit BB-PU-NN1. The baseband processing unit BB-PU-NN1 may provide the indicator IND and information DS of the data being determined for the second downlink transmission DT2 to the transmitter apparatus TA-BS.

The steps S2-M1 and S5-M1 of the method MET-NN1 may be executed by the transmitter apparatus TA-NN1.

Figure 5:
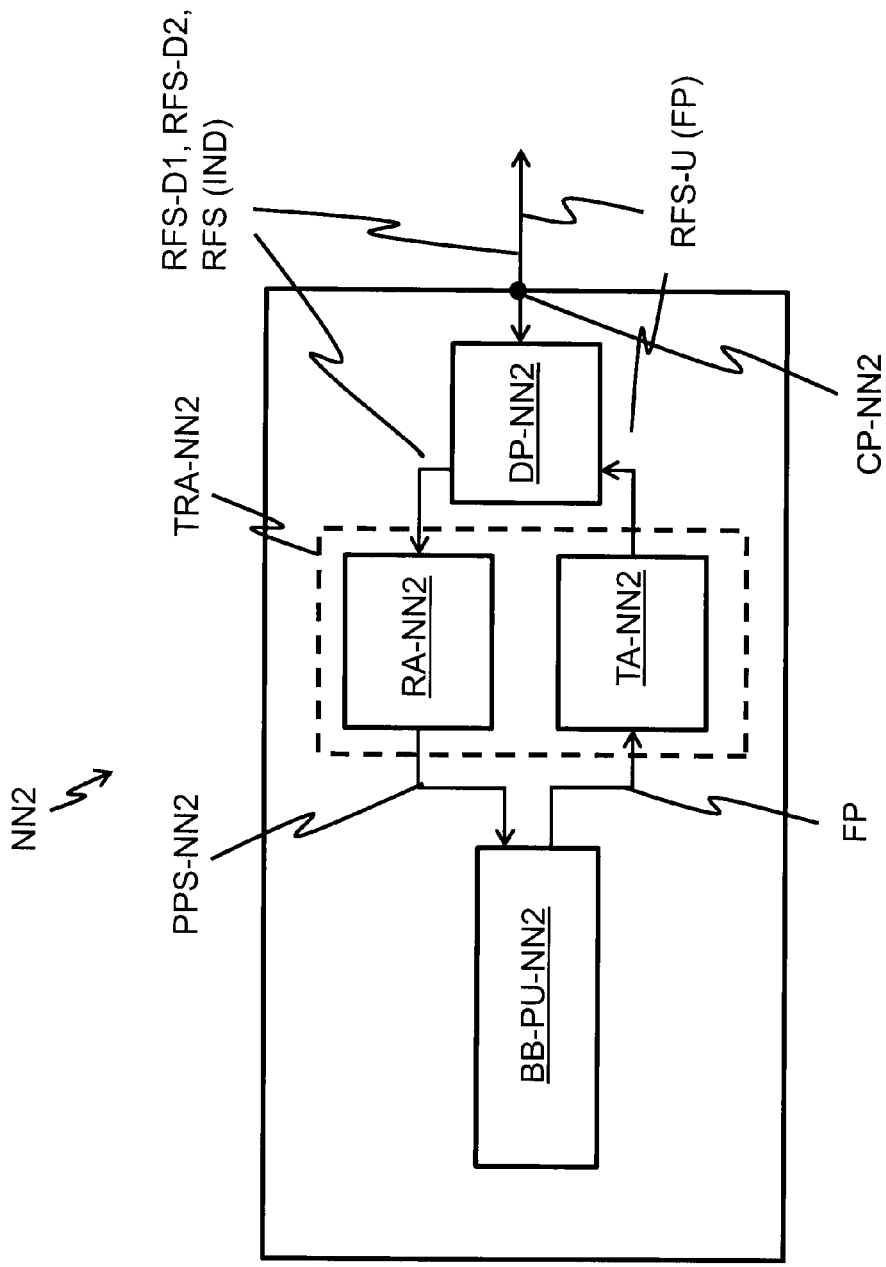
FIG. 5 shows schematically an exemplarily block diagram of the second network node.

FIG. 5 shows exemplarily the second network node NN2, which executes the method MET-NN2 (see FIG. 3). The second network node NN2 may be for example the mobile station MS as shown in FIG. 1. In alternative embodiments, the first network node NN1 may be a base station or a relay station of a radio communication system or a network node of a high-speed LAN as described above.

A splitting of processing functions across processing units shown in FIG. 5 is not critical, and as can be understood by those skilled in the art that the number of processing units, the number of processing functions and an allocation of the processing functions to the processing units may vary without departing from the scope of the embodiments of the invention as defined in the appended claims.

The second network node NN2 may contain a connection point CP-NN2 for a wire connection to an antenna system, a duplexer DP-NN2, a receiver apparatus RA-NN2, a transmitter apparatus TA-NN2 and a baseband processing unit BB-PU-NN2. The receiver apparatus RA-NN2 and the transmitter apparatus TA-NN2 may be for example parts of a transceiver apparatus TRA-NN2 or may be separate units.

Following description is given exemplarily for the case, when the second network node NN2 is the mobile station MS as shown in FIG. 1.

The first downlink radio frequency signals RFS-D1, the second downlink radio frequency signals RFS-D2 and the radio frequency signals RFS containing the indicator IND may be provided via the connection point CP-NN2 and the duplexer DP-NN2 to the receiver apparatus RA-NN2. The second uplink radio frequency signals RFS-U may be provided via the duplexer DP-NN2 and the connection point CP-NN2 to the antenna system of the mobile station.

The steps S1-M2 and S5-M2 of the method MET-NN2 may be executed by the receiver apparatus RA-NN2, which may perform for example a pre-processing for the received first downlink radio frequency signals RFS-D1, the received second downlink radio frequency signals RFS-D2 and the received radio frequency signal RFS containing the indicator IND with steps such as down-conversion, demodulation and/or decoding for obtaining pre-processed signals PPS-NN2. The receiver apparatus RA-NN2 may provide the pre-processed signals PPS-NN2 to the baseband processing unit BB-PU-NN2.

The steps S2-M2, S3-M2 and S6-M2 of the method MET-NN2 may be executed for example by the baseband processing unit BB-PU-NN2 by further processing the pre-processed signals PPS-NN2 for recovering and obtaining the data segments DS1-1, DS2-1, DS3-1 of the first downlink transmission DT1, for recovering and obtaining the data of the second downlink transmission DT2 and for recovering and obtaining the indicator IND. The baseband processing unit BB-PU-NN2 may provide the feedback parameter FP to the transmitter apparatus TA-NN2.

The step S4-M2 of the method MET-NN2 may be executed by the transmitter apparatus TA-NN2.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for transmitting", "means for receiving", "means for determining" etc. (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods MET-NN1, MET-NN2 disclosed in the specification or in the claims may be implemented by a device having means for performing each of the respective steps of these methods. Preferably, a computer program product may contain computer-executable instructions for performing the methods MET-NN1 or MET-NN2, when the computer program product is executed on a programmable hardware device such as a DSP, an ASIC or an FPGA. Preferably, a digital data storage device may encode a machine-executable program of instructions to perform the methods MET-NN1 or MET-NN2.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for a first network node for transmitting or retransmitting data to a second network node, said method comprising:
    receiving a feedback parameter at said first network node from said second network node in response to a first transmission of at least two data segments of a data packet from said first network node to said second network node,
    determining at said first network node for a second transmission from said first network node to said second network node said data as a function of said feedback parameter, and
    transmitting or retransmitting said data by said second transmission from said first network node to said second network node,
    wherein said feedback parameter is a number representing a count of data segments of said at least two data segments incorrectly received or lost at said second network node or a number representing a count of data segments of said at least two data segments correctly received at said second network node by said first transmission.

2. The method according to claim 1, wherein said data are new data segments not yet transmitted, when said feedback parameter indicates an error-free reception of all data segments of said at least two data segments or wherein said data are further redundancy information for said at least two data segments, when said feedback parameter indicates at least one of said at least two data segments as being incorrectly received or lost.

3. The method according to claim 2, wherein said method further comprises selecting said data based on a transmission and retransmission policy and wherein said transmission and retransmission policy comprises rules, when said feedback parameter indicates said error-free reception of alt said data segments of said at least two data segments and when said feedback parameter indicates said at least one of said at least two data segments as being incorrectly received or lost.

4. The method according to claim 3, wherein said transmission and retransmission policy is predefined at said first network node and at said second network node and wherein said method further comprises adapting said transmission and retransmission policy by said first network node for optimizing said determining of said data based on said feedback parameter and transmitting an indicator for a structure of said data from said first network node to said second network node.

5. The method according to claim 2, wherein said further redundancy information is one of the following:
    a single network coded superposition of all data segments of said at least two data segments, when a single data segment of said at least two data segments has been incorrectly received or lost,
    a single network coded superposition of all data segments of said at least two data segments, when all data segments of said at least two data segments have been incorrectly received or lost, at least one network coded superposition of at least two data segments of said at least two data segments, when at least one data segment of said at least two data segments has been incorrectly received or lost, and at least one network coded superposition of at least one of said at least two data segments and of at least one of said new data segments.

6. The method according to claim 5, wherein a number of said at least one network coded superposition being retransmitted by said second transmission is equal to a number of said at least two data segments being incorrectly received or lost.

7. The method according to claim 5, wherein said at least one network coded superposition and at least one further network coded superposition for said second transmission comprise different data segments of said at least two data segments or comprise at least one same data segment of said at least two data segments.

8. The method according to claim 2, wherein said feedback parameter received from said second network node in response to said second transmission comprises a sub-counter for a success or failure of data segments for which further said further redundancy information has been transmitted and comprises a further sub-counter for a success or failure of said new data segments.

9. A non-transitory computer readable medium carrying instructions which when executed by at least one processor cause the at least one processor to perform the method of claim 1.

10. A method for a second network node for receiving data transmitted or retransmitted from a first network node, said method comprising:

determining a feedback parameter at said second network node in response to a first transmission of at least two data segments of a data packet from said first network node to said second network node to be used to determine, at said first network node, data to be transmitted in a second transmission from said first network node to said second network node, transmitting from said second network node said feedback parameter to said first network node, and receiving at said second network node said data by a second transmission from said first network node, wherein said feedback parameter is a number representing a count of data segments of said at least two data segments incorrectly received or lost at said second network node or a number representing a count of data segments of said at least two data segments correctly received at said second network node by said first transmission.

11. The method according to claim 10, wherein said second network node is configured depending on a predefined criterion to either report an acknowledgement indicator or a non-acknowledgement indicator for said at least two data segments in response to said first transmission or to report said feedback parameter.

12. The method according to claim 11, wherein said predefined criterion is a predefined load in a radio cell, wherein said acknowledgement indicator or said non-acknowledgement indicator are reported, when a current load is below or equal to said predefined load and wherein said feedback parameter is reported, when said current load is above said predefined load.

13. A non-transitory computer readable medium carrying instructions which when executed by at least one processor cause the at least one processor to perform the method of claim 10.

14. A first network node for transmitting or retransmitting data to a second network node, said first network node comprising:

at least one processor configured to:

receive a feedback parameter from said second network node in response to a first transmission of at least two data segments of a data packet from said first network node to said second network node, determine, for a second transmission from said first network node to said second network node, said data as a function of said feedback parameter, and transmit or retransmit said data by said second transmission to said second network node, wherein said feedback parameter is a number representing a count of data segments of said at least two data segments incorrectly received or lost at said second network node or a number representing a count of data segments of said at least two data segments correctly received at said second network node by said first transmission.

15. A second network node for receiving data transmitted or retransmitted from a first network node, said second network node comprising:

at least one processor configured to:

determine a feedback parameter in response to a first transmission of at least two data segments of a data packet from said first network node to said second network node, transmit said feedback parameter to said first network node, and receive said data by a second transmission from said first network node, wherein said feedback parameter is a number representing a count of data segments of said at least two data segments incorrectly received or lost at said second network node or a number representing a count of data segments of said at least two data segments correctly received at said second network node by said first transmission.

* * * * *